Nov. 13, 1951     H. S. DUEY     2,575,100

DUPLEX THERMOSTATIC VALVE

Filed May 11, 1948

INVENTOR.
HAROLD S. DUEY
BY
ATTORNEY

Patented Nov. 13, 1951

2,575,100

UNITED STATES PATENT OFFICE 2,575,100

DUPLEX THERMOSTATIC VALVE

Harold S. Duey, Fairfax, Calif.

Application May 11, 1948, Serial No. 26,365

2 Claims. (Cl. 236—1)

This invention relates to a duplex thermostatic valve for use as an automatic temperature control in systems in which the fluid used may be either hot or cold, depending upon the temporary requirements.

The invention will be described in connection with a fluid flow radiator system designed for heating or cooling a space such as a room. In a system of the kind described, a radiator within the room will be supplied with hot or cold water, or like fluid, depending upon whether it is desired to heat or to cool the room. Particularly in respect to the staterooms of ships, which in the course of their voyages pass from one extreme of climate, or of temperature conditions, to another, it is necessary at one time to cool the rooms and at another time to heat the rooms. It is desirable that the same equipment be useful for both purposes.

It is further desirable that the same automatic temperature regulating device be useable in the system in both events, so that duplicate parallel temperature control devices need not be furnished, one for use when the system is operating as a cooling unit and the other when it is operating as a heating unit.

It is an object of my invention to provide a valve mutually and cooperatively actuated by the combination of effects of the temperature within the room and the temperature of the water being used to cool or heat the room.

A further object of my invention is to provide a duplex thermostatic valve operating to control the flow of heating or cooling fluid to a radiator or heater in accordance with the requirements of the space to be heated, and using only one temperature responsive device within the room.

In the drawing, Figure 1 is a section of the valve which is the subject of this invention. The positions of the movable elements being those assumed when the room is below the desired temperature and the fluid is hot.

Figure 1:
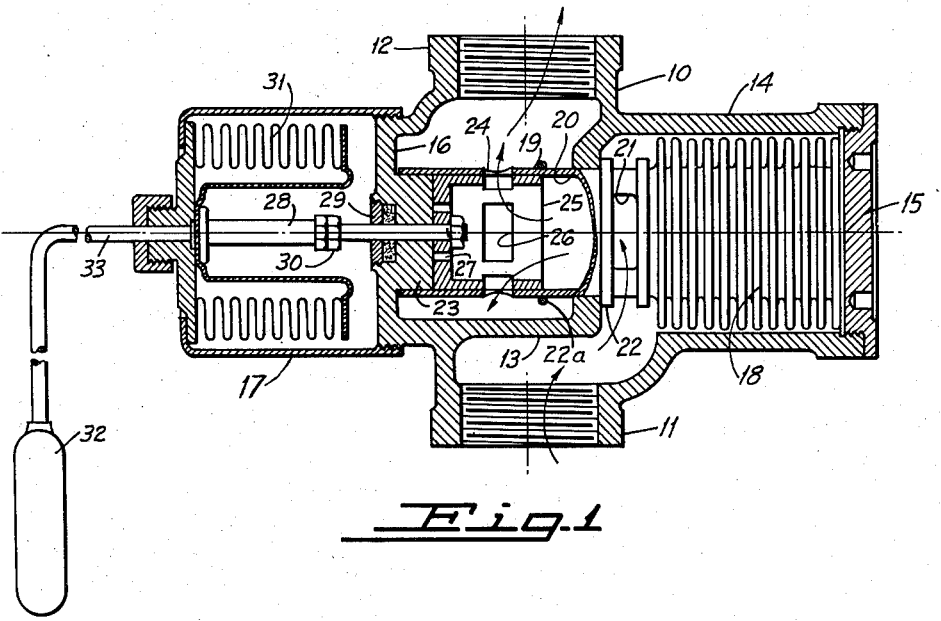

Referring to Figure 1, the valve body 10 has inlet and outlet ends referred to respectively by the numerals 11 and 12. It is obvious from the further description that the direction of flow of fluid through this valve, however, is immaterial and that the use of these terms is only for convenience. A partition wall 13 completely separates the inlet from the outlet end, except as hereinafter described.

As an integral portion of the valve body casting, there is provided a casing 14, having a closure 15, the axis of this casing being generally at right angles to the axis of the valve body. On the side of the valve body opposite the casing 14 is a wall 16 to which is adjustably secured a second casing 17, generally axially aligned with the casing 14.

Secured within the casing 14 is a temperature responsive motor means 18, the one illustrated being a flexible metal bellows and well known in the art. This motor 18 is filled with a fluid which contracts and expands under the influence of temperature changes, as is well known.

Secured to and moved axially by the motor 18 is a valve cylinder 19 which slides through a circular opening 20 in the wall 13. In that portion of the cylinder 19 which is to the right of the wall 13 in Figure 1, ports 21 are provided to permit the heating or cooling fluid to pass into the cylinder 19; the ports 21 are hereinafter sometimes called inlet ports. Within the portion of the body which is in communication with the outlet end 12, the cylinder 19 has outlet ports 24. The end of the cylinder 19 opposite the motor 18 slides upon a cylindrical boss 23 which is formed on the wall 16.

A stop ring or abutment 22 is formed on the cylinder 19, and this, in cooperation with the wall 13, establishes one of the two positions of the valve cylinder 19, which is in this case the position taken when the fluid in contact with the valve is hot. It will be evident that the fluid flowing in the system has access to the motor 18 and that the motor 18 is responsive to the temperature of the fluid. A snap-ring 22a held in a groove on the cylinder 19 forms a positive stop for the cylinder in its second position.

Sliding within the cylinder 19 is a closure 25 which has corresponding ports 26, so that in either open position of the valve, the fluid may pass through inlet 11, inlet ports 21, outlet ports 26 and 24 to the outlet 12.

In the rear wall of the closure 25 are provided relief openings 27 so that fluid which might get between the wall and the boss 23 will not prevent operation of the valve. The closure operating stem 28 passes through a packing gland 29 in the wall 16 and includes adjustable stop nuts 30 for determining one limit position of the closure 25, in this instance, the position assumed when the room is up to temperature.

The closure 25 is operated by a motor 31 which is responsive to the temperature of the room or other space to be heated. To achieve this, the bulb 32 and the tube 33 are in hydraulic communication with the flexible metallic bellows 31, and this entire system is filled with a suitable temperature responsive fluid.

Figure 2:
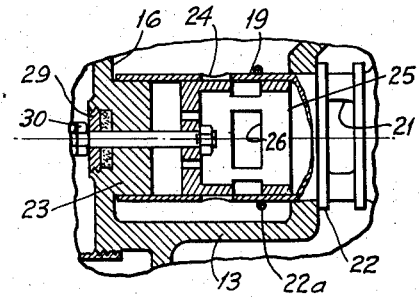
Figure 2 is a fragmentary view with parts in section showing positions as in Figure 1 when the room temperature has come up to the desired minimum.
Figure 3:
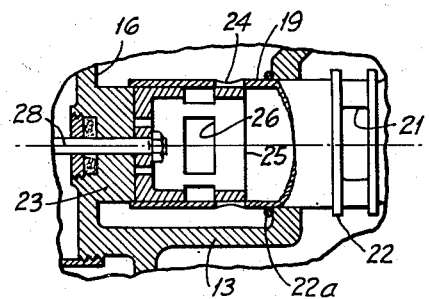
Figure 3 is a fragmentary view with parts in section showing the valve part positions in a cooling cycle when the room has been sufficiently cooled.
Figure 4:
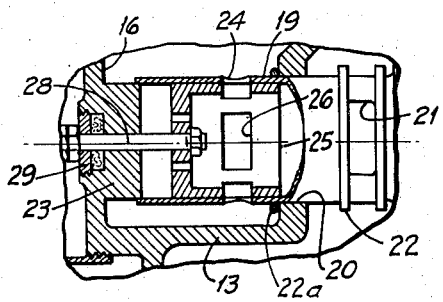
Figure 4 is a fragmentary view with parts in section like Figure 2, showing the valve part positions in a cooling cycle when the room temperature is too high.
Figure 5:
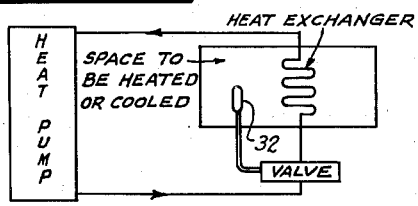
Figure 5 is a diagram indicating the manner of use of the valve in a system.

The operation of the device will be best understood by reference to the four figures of the drawing. Figures 1 and 2 show a heating cycle in which the fluid, flow of which is to be controlled by the valve, is at a temperature elevated with respect to that of the atmosphere about bulb 32, e. g. that of a room. Through the effect of this temperature, the motor 18 pushes the valve cylinder 19 to the position determined by the limit stop 22. In the case illustrated in Figure 1, the room is below the desired temperature. As the room comes up to temperature, the valve closure 25, under the influence of the motor 31, moves to the position shown in Figure 2, which results in cutting off the flow of heating fluid through the valve. Figures 3 and 4 indicate a cooling cycle, Figure 4 showing the position assumed by the closure 25 when the room is above a desired temperature and a cold fluid is to be circulated, while Figure 3 indicates the position assumed when the desired lower temperature has been attained and flow of the cold fluid through the valve is no longer necessary.

It will be apparent that the valve operates effectively to control the temperature of the room or other space being heated or cooled, on both heating and cooling cycles.

Obviously, the valve may be applied to systems used for purposes other than heating and cooling rooms. For example, the temperature of a body of liquid may be so controlled, and the term "space" would refer to such body of liquid.

The term "fluid" covers any liquid or gaseous heating agent controllable by such a valve, suitably modified, as to control the flow of hot or cold air, for example.

The temperature-responsive motor means may be any of those known to the art and capable of proper operation of the valve elements. The only essential is that one respond to the temperature of the circulating fluid and the other to that of the space to be heated or cooled. Ordinarily, the temperature difference between heating and cooling fluid will be so great that the valve tube 19 will take a position at one limit or the other, and not at some intermediate position, so that no special means need be provided to secure a quick action at some definite temperature.

The terms "heat" and "cool" are relative and not critical. The motors will be such as to operate correctly at the desired temperature of a particular installation.

I claim:

1. A valve of the type described comprising a body having an aligned inlet and an outlet opening having a common axis, a wall portion extending parallel to said axis with a first side thereof in communication with said inlet opening and including an opening therein, a tubular valve snugly slidable through said opening and along an axis perpendicular to said common axis and supported by said opening, said tubular valve having an inlet port opening on one side of said opening and an outlet port opening on the other side of said opening to provide communication from said inlet to said outlet opening, a tubular valve closure element slidably mounted in said tubular valve and having an opening at one end thereof in communication with said tubular valve inlet port and opening on the side thereof for alignment with said tubular valve outlet port, a rod slidably passing through a portion of said body for supporting one end of said tubular closure element, said tubular valve and said tubular closure element providing mutual support against pressure exerted perpendicular to said common axis, a first temperature responsive motor means within said body in the path of fluid flow from said inlet to said tubular valve for moving said cylinder axially from one limit position to another in accordance with the temperature in said body, and a second temperature responsive motor means responding to the temperature of a space external to the valve operating said closure whereby flow of fluid through said valve is controlled by the joint action of said first and second motor means.

2. A valve of the type described comprising a body having an inlet and an outlet opening, a wall portion separating said inlet and outlet and including a circular opening therein, a tubular sleeve mounted to snugly slip through said circular opening and providing the only means of fluid communication from the inlet to the outlet, said sleeve being movable along an axis perpendicular to the plane of said circular opening and including an outlet port on the outlet side of said wall, a tubular valve closure member movable along said axis and snugly fitted within said tubular sleeve, a rod slidable in a bearing in said body for supporting and moving said valve closure member, an outlet port in said closure element for alignment with said outlet port in said tubular sleeve upon relative motion of said sleeve and said closure member along said axis, a first temperature responsive means on said inlet side of said wall for moving said tubular sleeve along said axis from one limit to another, and a second temperature responsive means for moving said rod in response to a temperature in a space external to said valve.

HAROLD S. DUEY.

REFERENCES CITED

The following references are of record in the file of this patent:

UNITED STATES PATENTS

| Number | Name | Date |
| --- | --- | --- |
| 853,200 | Ellicott | May 7, 1907 |
| 1,512,805 | Roucka | Oct. 21, 1924 |
| 2,369,242 | Lawler | Feb. 13, 1945 |
| 2,463,598 | Carson | Mar. 8, 1949 |
| 2,495,226 | Crago | Jan. 24, 1950 |